(12) United States Patent
Cassell et al.

(10) Patent No.: US 7,266,717 B2
(45) Date of Patent: Sep. 4, 2007

(54) SYSTEM AND METHOD OF SELECTION AND COMMUNICATION OF A DISK FOR STORAGE OF A COREDUMP

(75) Inventors: Loellyn J. Cassell, Pleasanton, CA (US); Brian Parkison, Felton, CA (US); David Brittain Bolen, Durham, NC (US); Susan M. Coatney, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 538 days.

(21) Appl. No.: 10/764,773

(22) Filed: Jan. 26, 2004

(65) Prior Publication Data

US 2005/0177764 A1    Aug. 11, 2005

(51) Int. Cl.
*G06F 11/00* (2006.01)
(52) U.S. Cl. ............................................. 714/6; 714/37
(58) Field of Classification Search .................... 714/6, 714/37
See application file for complete search history.

(56) References Cited

U.S. PATENT DOCUMENTS

| | | | | |
|---|---|---|---|---|
| 5,293,612 | A | * | 3/1994 | Shingai ........................ 711/159 |
| 5,664,155 | A | * | 9/1997 | Elko et al. .................... 711/170 |
| 5,666,512 | A | * | 9/1997 | Nelson et al. ............... 711/114 |
| 5,819,292 | A | | 10/1998 | Hitz et al. |
| 5,963,962 | A | | 10/1999 | Hitz et al. |
| 5,996,086 | A | | 11/1999 | Delaney et al. |
| 5,999,933 | A | * | 12/1999 | Mehta ........................ 707/100 |
| 6,038,570 | A | | 3/2000 | Hitz et al. |
| 6,751,136 | B2 | * | 6/2004 | Hetrick et al. .............. 365/200 |
| 7,028,154 | B2 | * | 4/2006 | Reeves ........................ 711/162 |
| 2002/0069340 | A1 | * | 6/2002 | Tindal et al. ................ 711/203 |
| 2004/0186961 | A1 | * | 9/2004 | Kimura et al. .............. 711/138 |
| 2006/0075283 | A1 | * | 4/2006 | Hartung et al. ................. 714/5 |

OTHER PUBLICATIONS

U.S. Appl. No. 10/764,809, Susan M. Coatney et al.
U.S. Appl. No. 10/394,819, Loellyn J. Cassell et al.
David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

(Continued)

*Primary Examiner*—Scott Baderman
*Assistant Examiner*—Brian Assessor
(74) *Attorney, Agent, or Firm*—Cesari & McKenna, LLP

(57) ABSTRACT

This invention provides a system and method for selecting and communicating a single disk (a "coredump disk") for use in a coredump procedure by a failed file server (or filer). A selection method on the failed filer determines the "best candidate" coredump disk according to a predetermined set of criteria. For example, the available disks that can receive coredump data are located and ordered so as to prefer disks that best match the coredump data size requirement, are least likely to be needed for normal service by the server; and require the least preparation to receive coredump data. Appropriate attributes on the selected coredump disk are written to indicate that a coredump is in progress, and the location of the coredump data. Upon reboot of the failed filer (or takeover by a cluster partner), the coredump disk is identified and the coredump data recovered by reading back appropriate attributes.

31 Claims, 7 Drawing Sheets

OTHER PUBLICATIONS

Fielding et al. (1999) Request for Comments (RFC) 2616, HTTP/1.1.

Agbaria et al.A. et al. "Design, Implementation, and Perfomrance of Checkpointing in NetSolve" Dependable Systems and Networks, 2000. DSN 2000. Proceedings International Conference of New York, NY, Los Alamitos, CA, IEEE Comput. Soc. Jun. 25, 2000.

Adnan Agbaria and James S. Plank "Design, Implementation, and Performance of Checkpointing in NetSolve" Dependable Systems and Networks, 2000. DSN 200. Proceedings International Conference on New York, NY, USA Jun. 25-28, 2000, Los Alamitos, CA, USA, IEEE Comput. Soc. US, Jun. 25, 2000. XP010504315.

International Search Report for PCT/US2005/002480, International Searching Authority, Bujanska, Iveta, Sep. 13, 2005.

* cited by examiner

SYSTEM AND METHOD OF SELECTION AND COMMUNICATION OF A DISK FOR STORAGE OF A COREDUMP

RELATED APPLICATION

The invention is related to U.S. patent application Ser. No. 10/764,809 entitled SYSTEM AND METHOD FOR TAKEOVER OF PARTNER RESOURCES IN CONJUNCTION WITH COREDUMP, filed on even date herewith, and is incorporated herein by reference.

FIELD OF THE INVENTION

The present invention relates to file servers and more particularly to the bulk transfer or "dump" of file server memory contents for diagnostic purposes during a panic or failure.

BACKGROUND OF THE INVENTION

File Servers

A file server (also termed herein "filer") is a computer that provides file services relating to the organization of information on storage devices, such as disks. A file server or filer includes a storage operating system that implements a file system to logically organize the information as a hierarchical structure of directories and files on the disks. Each "on-disk" file may be implemented as a set of data structures, e.g. disk blocks, configured to store information, such as text. On the other hand, a directory may be implemented as a specially formatted file in which information about other files and directories are stored.

A filer may be configured to operate according to a client/server model of information delivery to thereby allow many clients to access files stored on a server, i.e., the filer. In this model, the client may comprise an application, such as a file system protocol, executing on a computer that "connects" to the filer over a computer network, such as point-to-point link, shared local area network (LAN), wide area network (WAN), or virtual private network (VPN) implemented over a public network such as the internet.

One type of file system is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a filer is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer that processes file-service requests from network-attached clients.

As used herein, the term "storage operating system" generally refers to the computer-executable code operable on a storage system that implements file system semantics and manages data access. In this sense, Data ONTAP™ software is an example of such a storage operating system implemented as a microkernel. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprised of a set of physical storage disks, defining an overall logical arrangement of storage space. Currently available filer implementations can serve a large number of discrete volumes. Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the redundant writing of data "stripes" across a given number of physical disks in the RAID group, and the appropriate storage of parity information with respect to the striped data. In the example of a WAFL file system, a RAID 4 implementation is advantageously employed. This implementation specifically entails the striping of data across a group of disks, and separate storage of parity on a selected disk of the RAID group. If a single disk in a RAID group fails, then that RAID group can continue to operate in a degraded mode. The failed disk's data can be reconstructed via parity calculations as described generally above. As described herein, a RAID group typically comprises at least one data disk and one associated parity disk (or possibly data/parity partitions in a single disk) arranged according to a RAID 4, or equivalent high-reliability, implementation. However, other configurations (e.g. RAID 0, RAID 1, RAID 4, RAID 5, or RAID DP (Diagonal Parity)) are contemplated. A further discussion of RAID is found in commonly owned U.S. patent application Ser. No. 10/394,819, entitled QUERY-BASED SPARES MANAGEMENT TECHNIQUE, by Loellyn Cassell, et al., the teachings of which are expressly incorporated herein by reference.

As will be described further below, each disk is divided into a series of regions that allow data writing and access to occur on the disk in a predictable manner. These regions include generally a disk label that is used by the RAID subsystem. The on-disk label is, in essence, self-describing information for each disk that is actively attached to the storage system. The labels are used to dynamically assemble the disks into spare pools and volumes. The process of assembling disks into volumes or spare pools according to the disk labels is herein termed "disk label assimilation." In the case that the label identifies the disk as part of a volume, the label is used to construct an in core configuration tree for that volume, starting from the disk object level up to the volume object level. Therefore, a label on a disk identifies that disk's participation in a RAID group and, furthermore, that group's association with plex, mirror and, ultimately, volume objects in the configuration tree. The label is located in a well-known location of the disk so that it can be queried by the RAID subsystem in accordance with disk label assimilation.

The storage system performs assimilation based upon disk labels and decides whether a given disk is to be placed into the general configuration of active storage, and where in the configuration it is to be placed. If a disk is deemed from its labels to be a "spare" and not part of the active storage configuration, then it is placed in a spares pool.

Other regions define the disk's table of contents, its file system area, and a core region, into which coredump information and other relevant information is stored. The disk regions are laid out in a logical and predictable manner within the disk's storage space. Certain information, like the table of contents, is located at a known offset so that the storage system can always access it when the disk is connected.

Internally, the file server or filer is a microprocessor-based computer in which one or more microprocessors are interconnected by a system bus to various system components that may be physically located on a motherboard and which include a memory, a buffer cache for storing data and commands, a network adapter for communicating over the LAN or another network, a firmware storage device such as an erasable programmable read only memory (EPROM—which may comprise a flash memory, that retains power during shutdown), that contains system firmware (including a boot mechanism), and various storage adapters for communicating with the physical disks attached to the filer.

Typically, disks are physically contained within a shelf enclosure unit, or "shelf." A shelf is a physical enclosure that primarily provides power and connectivity to its disks.

Filer Failure and Coredump

As used herein, the storage operating system that is executing on a filer "panics" or "fails" when it detects some fatal problem which prevents it from continuing to execute. This can also be called "soft failure" as distinguished from "hard failure," which occurs when the filer becomes more significantly disabled, for example, upon loss of electrical power or upon a hardware failure. A filer whose storage operating system panics is herein termed a "failed filer" (or "failed file server").

In order to assist in ascertaining the cause of the fault (e.g. to "debug" the failed filer), the failed filer or other storage system typically performs a "coredump," operation, in which it writes its current working memory (also termed, the "coredump") contents to disk. Later, a coredump recovery process that is termed herein "savecore" reads back the coredump data and generates a "coredump file," which it stores in the failed filer's root file system for subsequent access by an appropriate utility. The coredump file contains an image of the system memory and any non-volatile storage at the time the panic occurred. The image can be subsequently accessed and studied to assist in determining the cause of the failure event. This information assists in diagnosing the fault since it is a picture of the system at the time the failure occurred.

As noted below, time is of the essence in a panic scenario—thus, in order to expedite the complete creation of the coredump, the coredump operation typically spreads the coredump across specially allocated core regions located on multiple disks. Typically, the coredump is written in (for example) 3-MB data chunks to the designated region in a set of non-broken/operative disk currently owned by the failed filer. When the designated region on a given disk fills up, that disk is taken out of the list of available disks. The 3-MB data chunks written to disks are typically uncompressed where space permits, or can be compressed where space is at a premium—and this compressed data can be written out sequentially to disks, rather than "sprayed" across the disk set, potentially filling some disks before others. Along with coredump data, a core header is written to the designated region on each and every disk in the given disk set, and includes the number of that particular disk within the set, so that a resulting coredump file can be reassembled from the disk set at a later time.

In the case of a clustered environment, where more than one file server may be able to take control of a given disk set via ownership reservations, the coredump is only directed to owned disks of the failed filer. Because the coredump spreads the coredump over multiple disks, those disks are not otherwise accessible to the partner filer to begin the takeover process. Rather, the disks remain occupied with the actions of the failed filer in writing of the coredump.

Where a coredump procedure is to be undertaken, upon detection of a failed filer storage operating system, it is often desirable to employ a single disk to receive the coredump data, rather than distributing the data across a set of on-line disks in a "sprayed" fashion. For example, in the case of a clustered configuration where two or more filers may be interconnected to provide failover capabilities with a group of disks, the ability for the failover filer to rapidly (and in parallel with coredump) gain ownership of all but the coredump disk greatly speeds takeover. Disk ownership and the process of coredump concurrent with takeover are described in detail in the above-incorporated-by-reference U.S. patent application Ser. No. 10/764,809, entitled SYSTEM AND METHOD FOR TAKEOVER OF PARTNER RESOURCES IN CONJUNCTION WITH COREDUMP. In other standalone filer/storage system implementations, the use of a single disk to receive coredump data is often desirable as well.

In general, a good candidate as a coredump disk is one of the available spare disks typically provided in a disk set for use in volume creation, extending existing volumes, RAID reconstruction, and other disaster recovery or maintenance related operations. In general, reconstruction is an operation by which a spare disk is allocated to replace an active file system disk that has failed, parity data is used to regenerate the data that had been stored on the failed disk, and the regenerated data is written to the replacement disk. More particularly, a spare disk is one that is labeled to indicate that it is a spare and so not currently assigned any file system data storage functions. It typically stands ready for use as required by the above named operations. Typically, a spare disk undergoes formatting to prepare it for use in normal/regular file services. For example, in the exemplary filer storage operating system, a spare disk initially has a label that indicates its status as a non-formatted spare. Formatting that spare entails a "zeroing" process by which a pattern of zeroes is written the disk, followed by a label update process by which labels are written to indicate this disk's table of contents and its status as a formatted spare.

In a coredump operation, the system must decide whether an appropriate candidate for a coredump disk exists, and if so, which spare disk is the best candidate for becoming a coredump disk. After the coredump is completed, there must be a mechanism to release the coredump disk status so that the disk can be redesigned as a "hot" spare.

SUMMARY OF THE INVENTION

This invention overcomes the disadvantages of the prior art by providing a system and method for selecting and communicating a single disk (a "coredump disk") for use in a coredump procedure by a failed file server (or filer). In particular, the failed filer writes the coredump data to a single "coredump disk." This enables useful modes of coredump in both standalone and cluster filer environments. In all environments, it enables handling of coredump from very large memory systems with only a few disks, minimization of wasted disk space due to coredump, and minimization of the impact on normal/regular file service. For example, in both standalone and cluster environments, the use of a single coredump disk that is not involved in regular file services prevents interference of I/O (input/output) required for the coredump recovery "savecore" process with normal file services I/O. In a cluster environment, this enables a cluster filer to rapidly take over and restore regular file services on behalf of its partner, because the takeover can proceed in parallel with an independently of the coredump. In a SAN environment with a cluster of tightly or loosely coupled filers, it enables sharing of a single disk between multiple filers for coredump.

In an illustrative embodiment, a selection method on the failed filer makes a determination of the "best candidate" to use for the coredump disk by selecting and ordering disks according to a set of selection criteria.

A particular ordering scheme for finding the best candidate may entail identifying disks (or other data storage devices) in the pool of candidate disks that are available and sized to receive the coredump. These disks are typically part of a pool that is designated as a spare pool by the failed filer, and/or shared with other filers on a networked storage (SAN, for example) fabric. Once identified, selecting the best candidate disk is based upon a predetermined combination criteria including: (i) which disk of the pool of candidate disks is adapted to complete reception of the coredump in the shortest time; (ii) which disk of the pool of candidate disks is adapted to complete reception of the coredump with the least disruption of the normal file service; and (iii) which disk of the pool of candidate disks is adapted to receive the coredump with minimal excess of storage space in the predetermined coredump storage region after reception is complete.

In an illustrative embodiment, the selection includes: (a) selecting or identifying available disks (from filer spare pool that may be shared with other filers on a SAN fabric, or another networked storage architecture) that can receive a coredump; (b) ordering those disks so as to prefer disks that are least likely to be needed for file system service; (c) further ordering disks so as to prefer disks that require the least preparation to receive a coredump; (d) selecting as the "best candidate" the first disk in the order after steps a-d.

Typically, the selection involves writing specific attributes to labels and headers is stored in various regions of the coredump disk. Commonly employed attributes may include ownership of the disk (e.g. owned by the failed filer), whether the disk is formatted for use as a file system disk, whether the disk contains a coredump, and if so where on the disk coredump data resides.

In the illustrative embodiment, actual coredump data is written by the failed filer to the region that normally contains file system data when the disk is used for storing file system data. Another on-disk attribute is maintained that indicates the progress of the coredump, including whether the coredump has completed or aborted. Later, typically upon reboot or upon takeover by a partner filer in a cluster environment, a search is conducted to determine whether a coredump disk owned by the failed filer is present. This search is typically performed early during the boot or cluster takeover process, and involves reading back and evaluating attributes on each disk to determine whether it is a coredump disk. This process of identifying the coredump disk is expensive in terms of I/O, so the labels may be cached to avoid having to re-read all of the labels again for boot-time or takeover-time disk label assimilation.

After normal file services for the failed filer have been restored, a "savecore" process begins monitoring the attribute that indicates the progress of the coredump. At the point that coredump is complete, the savecore process begins formatting core data in memory and saving the formatted data, typically to a file on the root file system of the filer that generated the coredump. Finally, when the savecore process is complete, the attributes on the coredump disk are updated accordingly.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The teaching of this invention can be adapted to a variety of storage system architectures, but not limited to, a network-attached storage environment, a storage attached network, and a disk assembly directly attached to a client/host computer. The term "storage system" should therefore be taken broadly to include such arrangements. However, it should be understood that the teachings of this invention can be applied to any server systems. It is expressly contemplated that the various processes, architectures and procedures described herein can be implemented in hardware, firmware or software, consisting of a computer-readable medium including program instructions that perform a series of steps.

Should the reader already be familiar with the general discussion of a file server environment and the process of conducting coredump with a single disk, then he or she is invited to refer directly to the last section of this Description entitled Selection of Coredump Disk.

File Server Environment

Figure 1:
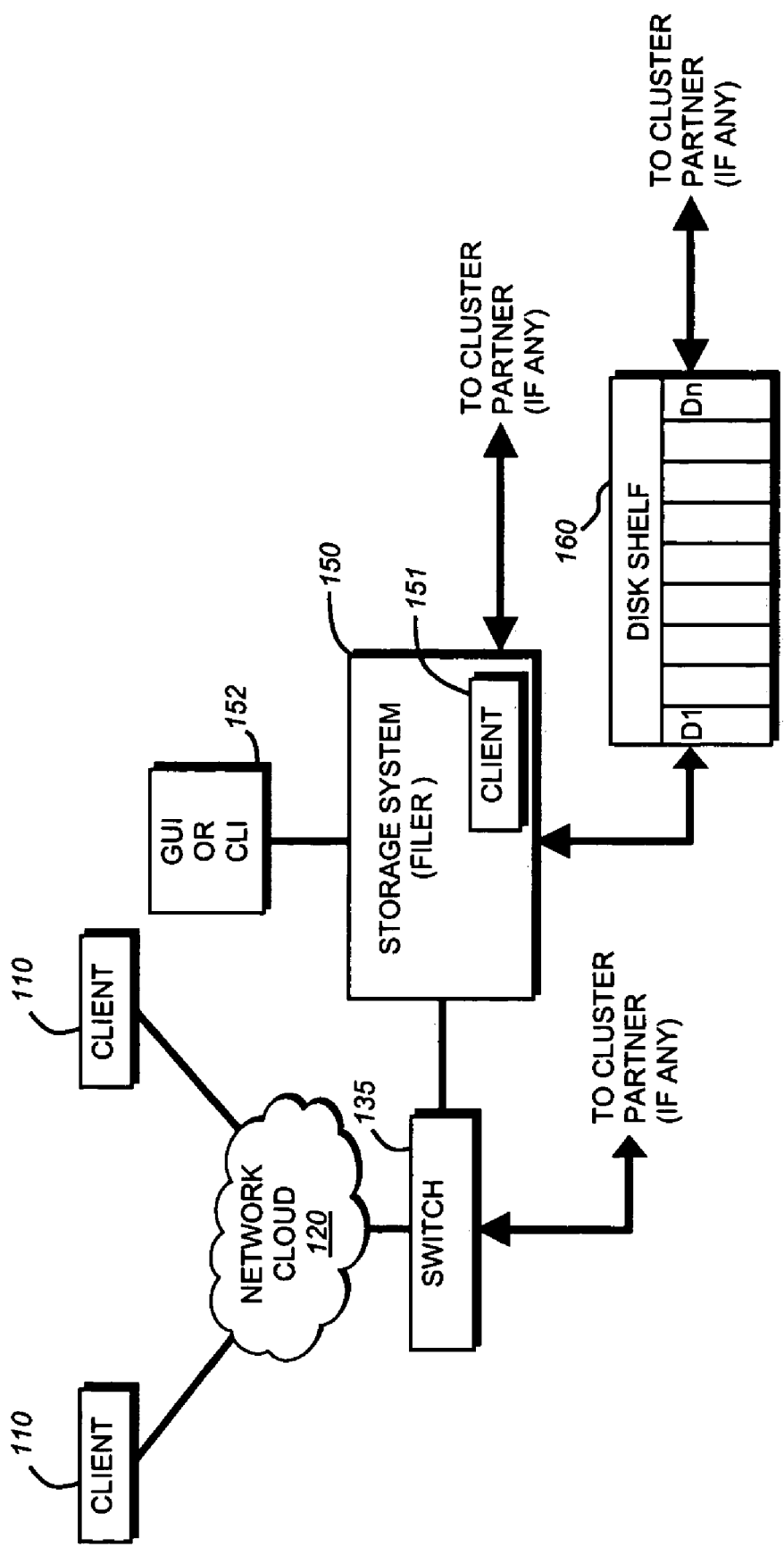
FIG. 1 is a block diagram of an exemplary filer in a storage system environment.

FIG. 1 is a block diagram of a filer or file server 150. In this description, the terms "filer," "file server" and "storage system" are used synonymously and can refer to any type of storage system that provides access to a set of storage disks or similarly functioning media. While the filer 150 is shown as a standalone unit, attached to a shelf 160 of disks D1-Dn, it is expressly contemplated that this filer can be part of a network of storage devices or a cluster in which failover capability is provided as described in the above-incorporated U.S. patent application Ser. No. 10/764,809, entitled SYSTEM AND METHOD FOR TAKEOVER OF PARTNER RESOURCES IN CONJUNCTION WITH COREDUMP.

Accordingly, appropriate cluster interconnections for use with a cluster partner are shown as an option.

According to FIG. 1, filer 150 is preferably a file server configured to provide file services relating to the organization of information on storage devices, such as hard disks D1-Dn in a disk shelf 160 (or a plurality of disk shelves), respectively to clients 110 connected through a network 120. A client 110 may be a general-purpose computer, such as a personal computer (PC) or a workstation, configured to execute applications over an operating system that include file system protocols. Moreover, each client 110 interacts with the filer 150 in accordance with a client/server model of information delivery. That is, a client 110 requests the services of a filer 150, for example, to retrieve files or other data containers (e.g. blocks). In this example, clients 110 access the filer 150 via the network cloud 120, switch 135 and any associated physical communication links.

While not shown, the filer 150 may be part of a cluster that can, itself, be connected via a network (for example a Fibre Channel loop) to other clusters or individual file servers/filers to form a networked storage system (such as a SAN). Appropriate interfaces and interconnects (not shown) are provided to each filer and/or disk shelf to implement such a networked storage arrangement.

Clients 110 typically communicate with the filer 150 over a network using a known file system protocol consistent with the operating system running on the client. The Network File System (NFS) is a file system protocol for accessing filers in a UNIX environment. The Common Internet File System (CIFS) is an open-standard, connection oriented protocol providing remote file access over a network and is used with filers to provide service to PCs in a Windows environment. Accordingly, CIFS is widely used with servers, such as filers, that have PC clients accessing them.

The filer 150, in this example, also implements a non-volatile random access memory (NVRAM) 151 that ensures fault-tolerant operation in the event of a failure of the filer. In particular, the NVRAM stores a given amount of data and information relative to the filers working memory and retains that data and information until it is committed to long-term storage at a predetermined "consistency point" in time.

The filer 150 also has a conventional Graphical User Interface (GUI) or Command Line Interface (CLI) 152 that provides a manual interface to the filer for a system operator.

Figure 2:
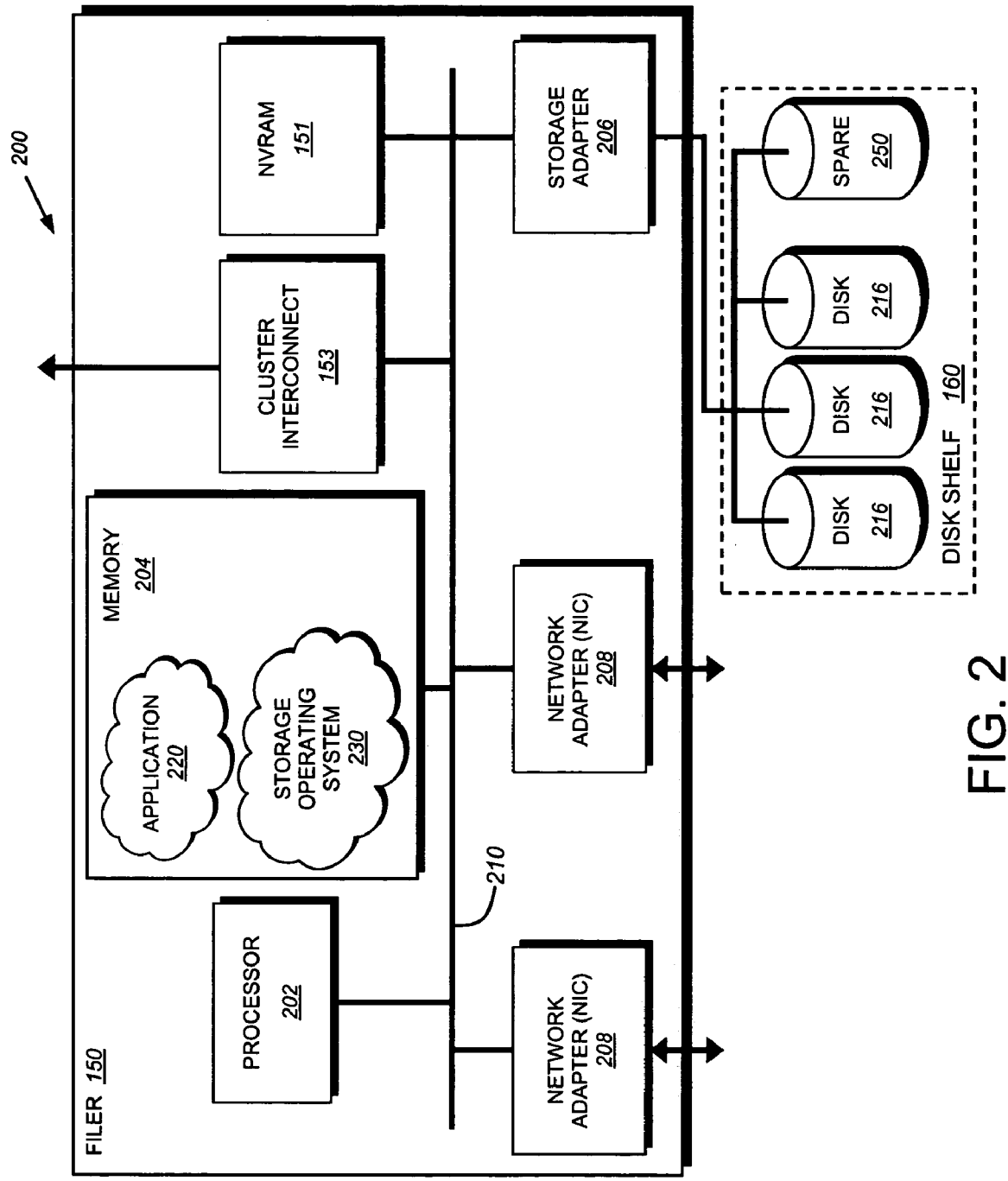
FIG. 2 is a more-detailed block diagram of a filer that may be used with the present invention.

FIG. 2 is a more-detailed block diagram 200 of the exemplary filer 150 comprising TAKEOVER OF PARTNER RESOURCES IN CONJUNCTION WITH COREDUMP a processor 202, cluster interconnect 153 (where a cluster partner may be present), NVRAM 151, a memory 204, a storage adapter 206 and at least one network adapter 208, all of which are interconnected by a system bus 210. The bus 210 can be a conventional peripheral computer interconnect (PCI) bus or another appropriate internal bus standard. In this embodiment, the storage adapter 206 is connected to disks 216 (D1-Dn in FIG. 1) via a Fibre Channel link. The filer 150 also includes the preferable storage operating system 230 stored in memory 204 that implements a file system to logically organize information stored as a hierarchical structure of directories and files on the disks 216. Disks are typically organized as a RAID (Redundant Arrays of Inexpensive Disks) group to protect against data loss caused by disk failure in a manner known in the art. Depending upon the RAID implementation, a RAID group may be entirely contained within a shelf, or may span multiple hardware components, including shelves.

The storage adapter 206 cooperates with storage operating system 230 executing on processor 202 to access stored information requested by a client 110, which information is stored on hard disks 216 (D1-Dn). Storage adapter 206 includes input/output (I/O) interface circuitry that couples to the disks 216 over an I/O interconnect arrangement, such as a conventional high-performance, Fibre Channel serial link topology (not shown). Storage adapter 206 retrieves the stored information and it is processed, if necessary, by processor 202 (or storage adapter 206 itself) prior to being forwarded over system bus 210 to a network adapter 208, where the information is formatted into packets and returned via a network (not shown) to a client 110 (not shown in FIG. 2) that requested the information.

As discussed further below, one or more of the disks can be designated as spare disks 250. The RAID implementation determines whether any particular arrangement of spare disks 250 is required with respect both to hardware, including shelves, and with respect to volumes. RAID groups, and their associated disks 216.

Each network adapter in FIG. 2 may comprise a network interface card (NIC) 208 having the necessary mechanical, electrical and signaling circuitry needed to connect a filer to a network node switch (not shown) via the physical communication links.

Storage Operating System

Figure 3:
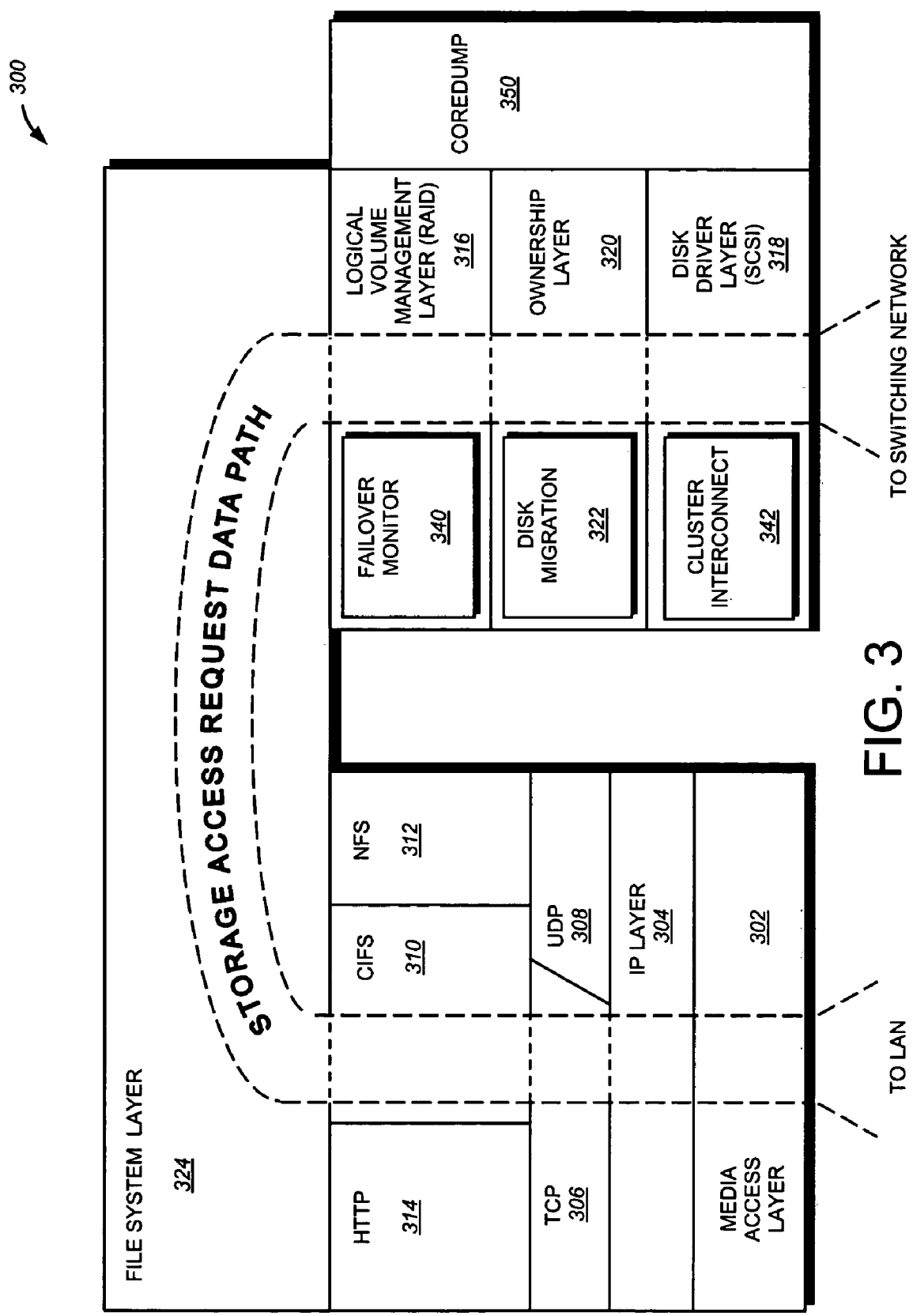
FIG. 3 is a schematic block diagram of a storage operating system for use with the exemplary file server of FIG. 2 according to an embodiment of the present invention.

FIG. 3 is a block diagram of an exemplary storage operating system 300 for use in accordance with an illustrative embodiment of this invention. Storage operating system 300 implements the specialized filer operations of the Data ONTAP™ storage operating system on each filer. The storage operating system comprises a series of software layers, including a media access layer 302 of network drivers (e.g., an Ethernet NIC driver) that function with network adapters 208 in FIG. 2. Storage operating system 300 further includes network protocol layers, such as the IP layer 304 and its supporting transport mechanisms, the Transport Control Protocol (TCP) layer 306, and the User Datagram Protocol (UDP) layer 308. A file system protocol layer includes support for the Common Interface File System (CIFS) protocol 310, the Network File System (NFS) protocol 312 and the Hypertext Transfer Protocol (HTTP) protocol 314.

In addition, the storage operating system includes a logical volume management (RAID) layer 316 that implements a disk storage protocol, such as the RAID protocol, and a disk driver layer 318 that implements a disk access protocol, such as a Small Computer System Interface (SCSI) protocol. Included within the disk driver layer 318 is a disk ownership layer 320, which manages the ownership of the disks with respect to their related volumes. A disk migration level 322 is a subset of the disk ownership level 320. In the event of a takeover, the filer's cluster partner (if any) logically assumes ownership of the storage. Briefly, to accomplish this in one example, the failover monitor layer 340 places its reservation on the disks that are being taken over.

The storage operating system also includes the failover monitor layer or function 340 that governs failover detection and initiation of takeover by the cluster partner. The cluster interconnect function 342 is also shown as part of the storage stack.

The coredump function 350 interacts with the RAID layer 316 and disk driver layer 318 to facilitate the transmission of the coredump in accordance with the teachings of this invention, as described further below.

Bridging the disk software layers with the network and file system protocol layers is a file system layer 324 that controls storage and retrieval of file system data.

Note that in an alternate embodiment the filer can be implemented as a multi-protocol storage appliance and the resident storage operating system can be implemented as a virtualization system with virtualization modules embodied as a virtual disk ("vdisk") module and a SCSI target module (not shown). The vdisk module is layered on the file system 324 to enable access by administrative interfaces, such as a streamlined user interface (UI), in response to a system administrator issuing commands to the multi-protocol storage appliance. In essence, the vdisk module manages SAN deployments by, among other things, implementing a comprehensive set of vdisk (lun) commands issued through the UI by a system administrator. These vdisk commands are converted to primitive file system operations ("primitives") that interact with the file system 324 and the SCSI target module to implement the vdisks. Generally, the file system layer 324 implements the file system having an on-disk file format representation that is a block based. The file system generated operations to load/retrieve the requested data of volumes if it not resident "in core," i.e., in the file server's memory. If the information is not in memory, the file system layer indexes into the mode file using the mode number to access an appropriate entry and retrieve a logical block number. The file system layer then passes the logical volume block number to RAID layer 316, which maps out logical number to a disk block number and sends the latter to an appropriate driver of a disk driver layer 318. The disk driver layer 318 accesses the disk block number from volumes and loads the requested data into memory for processing by the file server. Upon completion of the request, the file server and storage operating system return a reply, e.g., a conventional acknowledgement packet defined by the CIFS specification, to the client over the network. It should be noted that the software "path" through the storage operating system layers described above needed to perform data storage access for the client received the file server may ultimately be implemented in hardware, software or a combination of hardware and software (firmware, for example). This multi-protocol storage appliance arrangement is described in further detail in commonly owned U.S. patent application Ser. No. 10/216,453, entitled STORAGE VIRTUALIZATION BY LAYERING VIRTUAL DISK OBJECTS ON A FILE SYSTEM.

In a further alternate embodiment of the invention, some functions performed by the storage operating system may be implemented as logic circuitry embodied within a field programmable gate array (FPGA) or an application specific integrated circuit (ASIC). This type of hardware implementation increases the performance of the file service provided by a filer in response to a file system request issued by a client 110. Moreover, in another alternate embodiment of the invention, the processing elements of network and storage adapters may be configured to offload some or all of the packet processing and storage access operations, respectively, from the processor to thereby increase the performance of the file service provided by the filer.

Disk Regions

Figure 4:
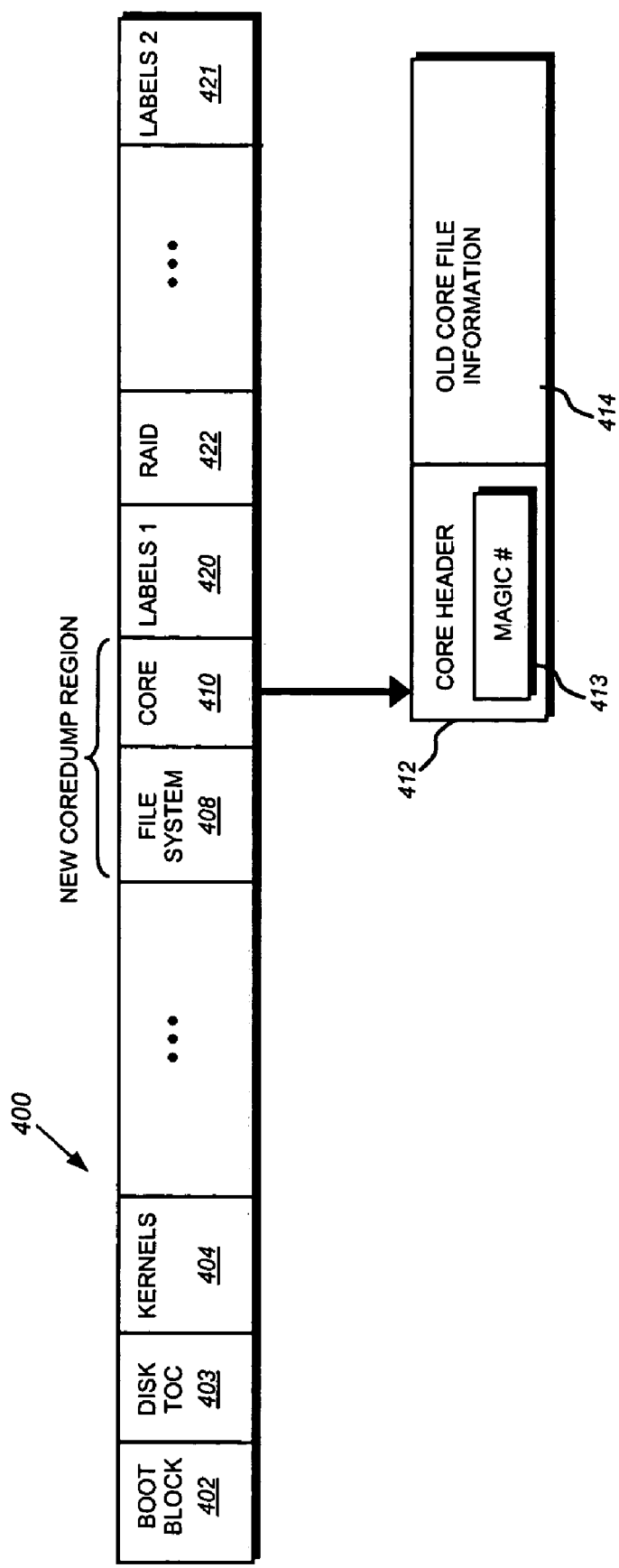
FIG. 4 is a diagram of the mapping of regions of a storage disk as used in an embodiment of the present invention.

While a variety of organizations are expressly contemplated, an exemplary embodiment, each disk contains a header information region at a standardized sector location that is known to the storage operating system. Various entries relative to the disk are provided at fixed offsets within this known region. As shown in FIG. 4, an exemplary disk (D1-Dn) is mapped out according to its storage regions. The RAID layer 316 generally implements this mapping 400. Note that the description of disk regions not directly relevant to this discussion are omitted for brevity. A further description of exemplary regions can be found in the above-incorporated U.S. patent application Ser. No. 10/764,809, entitled SYSTEM AND METHOD FOR TAKEOVER OF PARTNER RESOURCES IN CONJUNCTION WITH COREDUMP The bootblock region 402 is contained for example in the first 1 KB and is reserved for storing information about how to use the kernel region 404 on this disk, such as whether a valid kernel is present in the kernel region 404 of this disk. The region 403 contains the disk TOC (Table of Contents). The TOC is located at a fixed offset from the beginning of the disk so it can be easily located. The TOC contains the map of all of the regions on the disk, and generally includes a region type, offset, and size. The TOC region 403 may also include essential information about the disk required by the certain versions of the storage operating system, including the physical size of the disk. Two copies of the TOC are stored separately in the TOC region, in order to reduce the chance that both copies of the TOC are destroyed by a disk corruption event.

The kernel region 404 typically occupies for example the next 20 MB of disk storage and provides the area for storing appropriate portions of the storage operating system kernel.

The file system region 408 is used by the file system layer 324 to store file system data (e.g. data related to files and directories). The file system region extends to almost the physical end of the disk's usable storage sectors.

Note that the bootblock region 401, the TOC 403, the kernel region 404 and the file system region 408 are at a fixed offset from the physical beginning of the disk so as to be readily and reliably locatable.

Following the file system region 408 is the coredump or "core" region 410. This region is formed from excess free space at the physical end of the disk. Its size is limited according to the present embodiment due to the presence of additional regions to be described below. The core region 410 contains a core header (or core region header) 412 having a magic number 413. The magic number is stored in the first few bytes of the core header where it is readily located and scanned by both the failed and takeover partner filer. This magic number is, in essence, a coredump attribute designating whether or not a coredump is present, along with other status data. For example (see also below) the attribute might take the values of "no coredump," "coredump in progress," or "coredump complete." Hence, by scanning this attribute, a partner filer can determine whether it may initiate a takeover of a particular disk by checking its coredump attribute status and then placing reservations on inactive disks.

The remaining region 414 of the core region 410 is used to store a portion of the coredump according to the prior implementation. This region 414 is insufficient in size to store the entire coredump, however. A larger region is provided as described below, nevertheless, the core header 412 and magic number information remains in place so as to be readily locatable by the operating system.

In the illustrative embodiment, the label region 1 (420) and the label region 2 (421) follow the core region 410. These regions each contain a copy of the disk label, which describes whether a disk is a spare disk, or if the disk is in use for normal file service. If the latter is the case (normal file service), then additional information in the labels describes the RAID group, plex, mirror and volume with which this disk is associated. In order to reduce the chance that both copies of the label are destroyed by a disk corruption event, the labels are spaced apart. After label region 1 (420), a region 422 of 1 MB is reserved for use by the RAID system.

Note that the regions at the end of the disk, including the label regions (420 and 421), and the RAID region 422, are located at a fixed offset from the physical end of the disk.

In general, while a particular layout for disk regions is shown and described, this is only one illustrative example and a variety of layouts with a variety of types of regions can be provided. Some regions may be at fixed offset, while others are variable and utilize (for example) pointers for data indexing. In addition, the nature and information content of the regions provided on the disk can be varied. In alternate embodiments, specialized/discrete regions can be provided for specific information types. Similarly, certain disk information can be included in other regions than those in which such information is contained in this example. In general, the disk should provide a mapping of regions that leads to (among other goals) a predictable identification of contents, the existence of coredump data and status of such data.

Coredump Disk

Notably, the illustrative embodiment contemplates that a spare disk (or another inexpensive dedicated disk, such as a conventional ATA/IDE disk) is used to store the entire contents of the coredump. By assigning the coredump to a single spare or dedicated disk, all other disks owned by the failed filer (active file system disks and other spare disks) can participate in the takeover process while the coredump proceeds in parallel (e.g. contemporaneously). The spare disk is mapped generally in accordance with FIG. 4 as described. However, the core region 410 is now used mainly to store the magic number 413 related to coredump status and header information 412 that points into the file system region 408. The file system region on the spare disk is used to store coredump data. Accordingly, this area contains sufficient storage for a large coredump on a single disk. In this manner, the spare or other designated disk can be employed to receive the coredump whilst other disks are recovered and assimilated for normal file service.

Coredump Procedure

Figure 5:
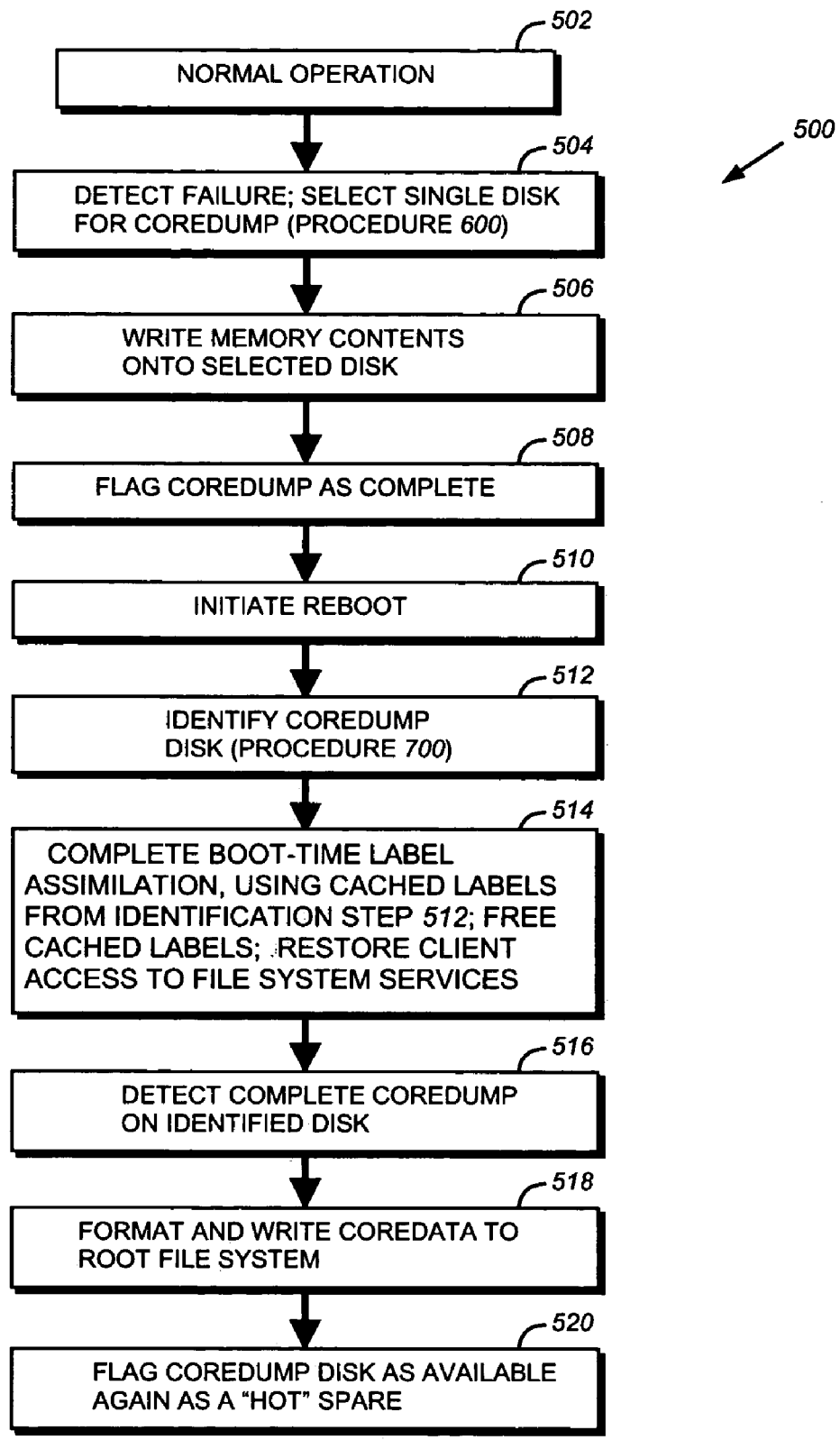
FIG. 5 is a flowchart illustrating the sequence of steps comprising a coredump in the event of a failure or panic of the filer of FIG. 2.

FIG. 5 is an exemplary flow chart of a procedure 500, which the exemplary filer undergoes in the event of a panic or failure so as to execute a coredump. It should be understood by those skilled in the art that some steps may be taken out of order, and that other intermediate steps not herein described may be taken without departing from the spirit of the invention.

In step 502, the filer operates normally and monitors its own operational status to detect a problem in its operation. Once the filer detects a failure or panic, it locates a single disk (typically a designated spare disk) to write its entire memory to as a coredump (step 504). The selection and manipulation of an appropriate disk to act as the coredump disk in accordance with an illustrative embodiment of this invention is described further below with reference to the procedure 600 shown in FIG. 6. In general, a disk is selected that is not otherwise used in regular file services. Such "file service" generally includes the handling and storage of data that is related to or requested by clients or that is otherwise needed for operation of the network (e.g. SAN) to which the filer is connected. As such, a spare disk associated with the failed filer is a good choice for the coredump disk as it is not presently involved in file service or network operations. Further, a non-formatted spare is a better choice than a formatted spare. This is for two reasons. First, the file system zone of the coredump disk will have had coredump data written to it, so at least that region must be zeroed. Second, it is preferable to avoid formatting spares multiple times.

At step 506, the filer writes its memory (and NVRAM) contents onto the selected coredump disk. When the coredump completes (if at all), the filer then changes a designated coredump attribute area (the magic number 413 in FIG. 4) on the selected coredump disk to indicate completion (step 508).

After completing coredump, the filer initiates a reboot procedure (step 510). Upon reboot, the now properly functioning filer (or a taking-over filer in the case of the above-referenced related patent application) reviews the label regions (420 and 421) and the core region 412 to identify the coredump disk. The identification of the coredump disk in accordance with an illustrative embodiment of this invention is described further below with reference to the procedure 700 shown in FIG. 7. In general, the labels for all disks are examined to find those that are labeled as a non-formatted spare. The labels are cached for later use in boot time or takeover time disk label assimilation. Then the core header on each non-formatted spare disks is examined in order to identify the coredump disk.

Note that it is possible to change from a single disk coredump to a standard "sprayed" coredump across a number of active disk core regions. This may occur if a single coredump disk is unavailable based upon a number of selection factors described below. In this case, the completed coredump is distributed in the standard core region of each disk, and upon reboot, the labels of the disks will reflect this state. Where a sprayed coredump is detected, standard post-reboot/recovery coredump procedures are then used.

In the procedure 500 of FIG. 5, reboot (specifically boot time disk label assimilation) is completed with the cached labels. Based upon these labels, client access to noncoredump/normal file system disks is restored as soon as practicable. This is particularly facilitated, since, based upon the caching of labels, they do not need to be reread for disk label assimilation to occur. After completing boot-time disk label assimilation, the cached labels may be freed (step 514).

Having identified the coredump disk (step 512 and procedure 700), the filer then attempts to access the complete coredump in step 516. The coredump data on the coredump disk is formatted and written to the root file system as a coredump file (step 518). The coredump file may include various diagnostic aids, such as bookmarks, indices and the like, or may be only raw data from the failed filer's memory. According to an illustrative embodiment, while a coredump file is created, any access to the coredump disk for the purpose of a RAID reconstruction is prevented (since a spare disk is normally available for such reconstruction purposes). After writing out the coredump file, the coredump disk can be returned to the status of a "hot" spare disk (step 520). Since the coredump disk labels already indicate that it is a non-formatted spare, its return is accomplished by rewriting the core region header attribute (413) to indicate a status of "no coredump."

Note that the core region header is used generally to ascertain the status of the spare as a coredump disk, and can be changed as needed. For example, the attribute can either denote a coredump state in which a coredump is active, completed, and/or progressing—for example "coredump in progress" or "coredump complete. Conversely the attribute can denote a non-coredump state wherein a coredump is not present/non-active or has been aborted prior to completion—for example, "no coredump" or "aborted coredump."

It is contemplated that use of a particular "aborted coredump" attribute, rather than simple "no core dump" may provide diagnostic information in certain embodiments. Also, in alternate embodiments that a partially written coredump may be preserved as a file in a manner similar to a complete coredump. In the illustrative embodiment, however, an aborted coredump causes the reboot to proceed as if no coredump was ever written.

While a disk is identified as a coredump disk it cannot be used for other normal/regular file services. This means that its is not available during the coredump operation as a "hot" spare for replacing a failed disk in a RAID group, nor can it be used for creating new volumes, mirroring existing volumes or increasing the size of an existing volume. During the coredump process, users attempting to access the disk will be provided with a message or other indicator stating that the coredump disk is occupied dumping or saving core memory data.

Selection of Coredump Disk

Figure 6:
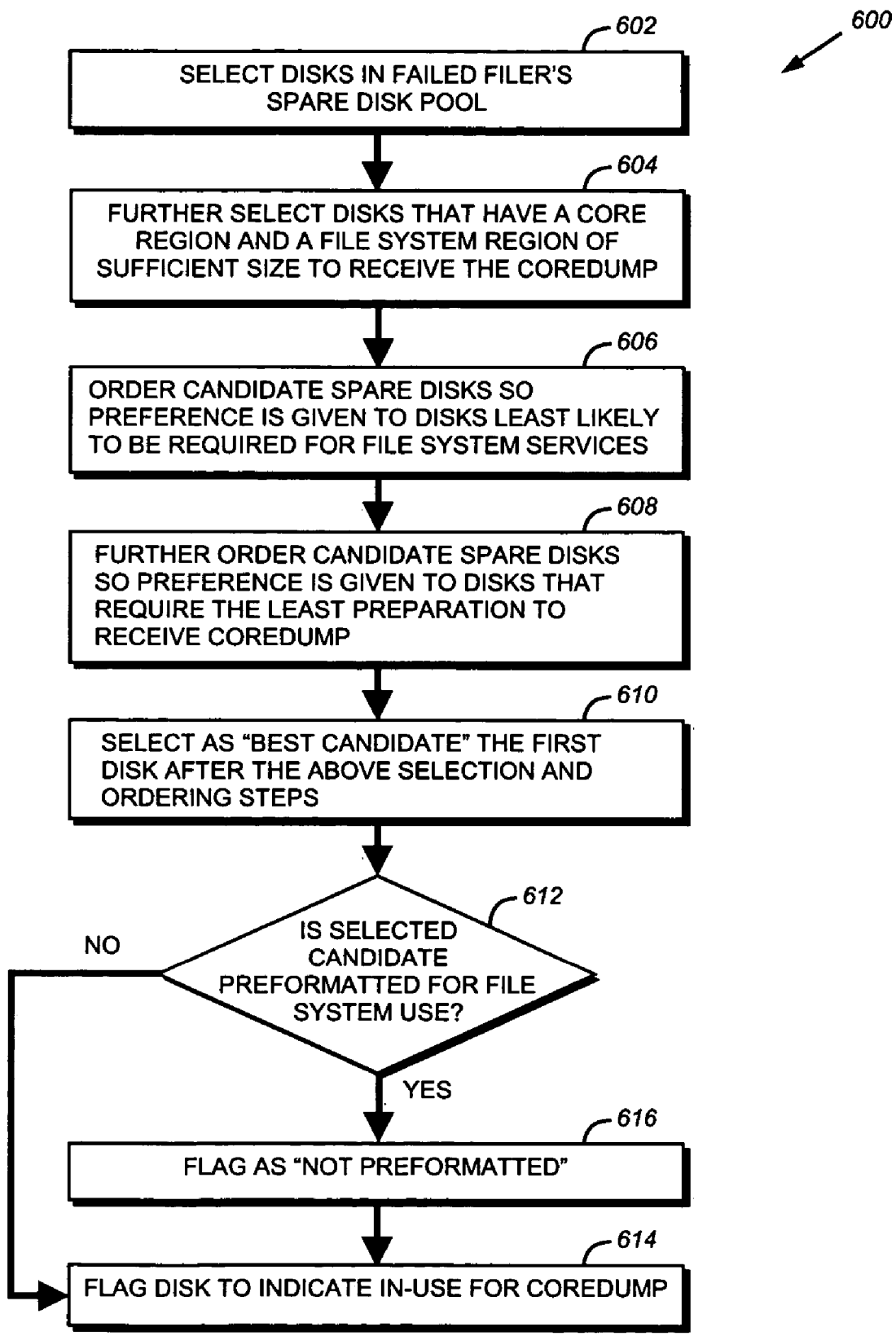
FIG. 6 is a flowchart of a procedure for selecting and preparing a coredump disk from a pool of available spares by the failed filer.

FIG. 6 details a procedure 600 for the selection of a coredump disk from a pool of candidate disks, typically drawn from the available spares associated with the failed filer. This procedure 600 is referenced in association with step 504 described above. After a panic occurs and the coredump utility 350 (FIG. 3) is notified, the coredump procedure begins (step 502). Disks from the failed filer's spare disk pool are selected (step 602). These disks are useful as they are not currently involved in normal file services, and will not interfere with such operations. In addition, since they are not involved in file service, their applicable file system region 408 (FIG. 4) is generally free of data and can be employed in coredump storage.

A further selection criteria is then employed by the procedure 600, in which the spare disks must have a core region 410, including a core header 412, and sufficient file system region 408 size to ensure storage of the coredump in its entirety (step 604). Some spare disks may not contain sufficiently large file system regions. The needed size is determined by studying the labels to determine available space (number of sectors, etc. and comparing it against a failed filer's on-line (and NVRAM) memory storage size. This storage size can be an actual amount of data currently stored in memory and NVRAM or a fixed number representing a maximum storage volume for the memory and NVRAM.

If no spare disks, or disks otherwise usable by coredump, are present (e.g. spares exist, but are needed for RAID reconstruct as described below), then the procedure 600 aborts or reverts to a conventional sprayed coredump. If only one usable spare disk is available, then it is the selected candidate. If more than one usable spare disk is available, then the procedure 600 attempts to locate the best spare for use. There are a variety of criteria that can be used to determine the best spare. Once disks of sufficient size are culled, in this embodiment, the first preference for a coredump disk candidate is given to disks that are least likely to be needed for normal file service (step 606). In particular, spare disks whose physical attributes (i.e., speed, sector size, capacity, etc.) are least similar to those of disks in use for normal file service, and so are least suited for addition to existing volumes, as replacement disks for reconstruction, or for other disaster recovery related use, are chosen and prioritized.

Next, the prioritized disks are ordered in terms of the amount of preparation needed to receive a coredump (step 608). Disks that are formatted require generally more preparation as they require labels to be updated to indicate that the disk is a non-formatted spare and the updated labels written to the label regions 420 and 421 on disk. Hence a non-formatted spare is preferred. Such a non-formatted spare disk has its regions mapped as shown generally in FIG. 4. As such, the non-formatted spare has a prepared core region (410) and file system region (408) that are readily written-to by the coredump process without further delay. If, however, a non-formatted spare is not available, the procedure 600 next looks for a spare that is in the process of being formatted. Such a spare may be usable, as needed labels for the coredump may still remain intact if the preformatting has not proceeded too far. Finally, if no non-formatted or in-the-process of being formatted spare disk is located by the procedure 600, then a formatted spare, if available, is used. In accordance with the decision block 612, the procedure determines whether the selected spare disk is still labeled in accordance with the format of FIG. 4. If not, then extra steps must be undertaken to format the disk with needed labels before is can receive the core magic number information (e.g. "coredump in progress") and the contents of the coredump. Based upon the ease of writing the coredump, the best candidate is finally selected (step 610).

Having determined whether any formatted disk exists, decision step 612 then determines whether the candidate was formatted for file system use. If not, the procedure branches to step 614, in which the selected disk is flagged with the indicator that a coredump is in progress. This prevents the use of the disk inadvertently as a file system disk as the failure and recovery progresses, but before coredump is complete. If, however the disk is non-formatted, then the procedure branches to step 616, where a "not-formatted" flag is appended to the disk. The procedure then moves to step 614 where the disk is further flagged with a coredump in progress flag. Because the disk is flagged as "not formatted," following coredump or abort of the coredump, the system will note the non-formatted status of the disk and move (at a convenient time) to format the disk so that it is again available for file system use.

Identification of Coredump Disk

Figure 7:
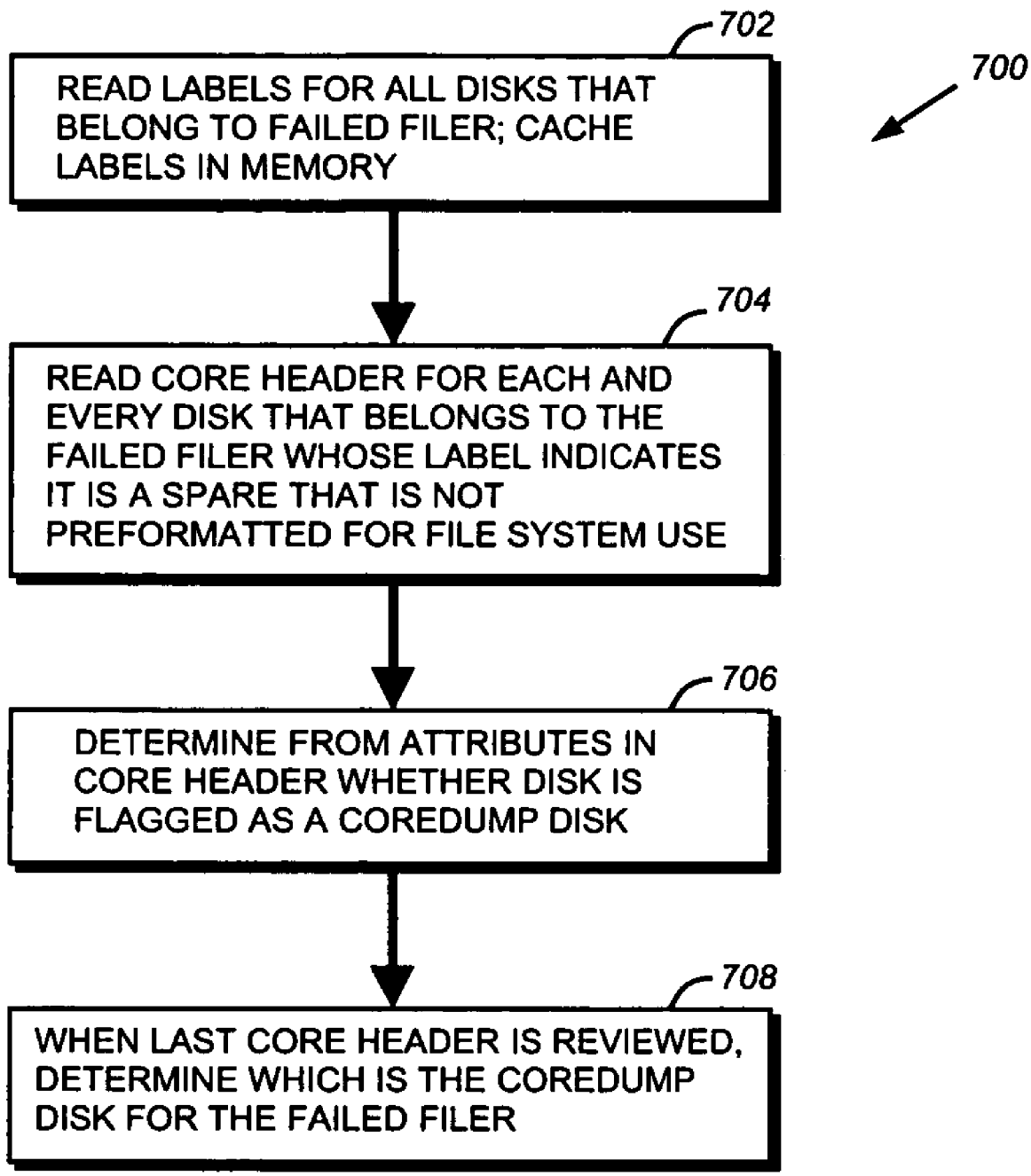
FIG. 7 is a procedure for discovering the coredump disk upon reboot or recovery of the failed filer of FIG. 2.

FIG. 7 describes a procedure 700 for the discovery and handling of the coredump disk selected in the procedure 600 of FIG. 6. This procedure is referenced generally in step 512 of FIG. 5. The RAID layer 316 of the recovering filer initially reads the disk labels of all connected disks and caches the information in its memory for later use (step 702).

Using the cached labels, the procedure 700 identifies any spare disks within the overall set of disks, and then the labels of these spares are further searched to locate a spare that is "not formatted" for file system use (step 740). This serves to locate the selected disk processed through decision step 612 (FIG. 6).

The procedure 700 then searches among the cached labels for a core region among the non-formatted spares for one containing the magic number indicating a coredump disk (step 706). The identity of this flagged coredump disk is noted by the filer. Finally, upon completion of the reading of all core headers in the applicable group, the procedure 700 makes the positive determination of the coredump disk based upon each of the search criteria above (step 708).

Note that the particular order/hierarchy of identification steps can be varied or combined in alternate embodiments.

Also note, in certain instances, the coredump disk may be needed immediately for normal storage operations, and thus must be shifted to the available disk pool before completion of the coredump or coredump file creation. If the coredump disk is needed during coredump, then a special "kill" signature can be written to the core header 412 on the coredump disk. The coredump function in the failed filer scans for this header, and when encountered, terminates the coredump operation.

The foregoing has been a detailed description of an illustrative embodiment of the invention. Various modifications and additions can be made without departing from the spirit and scope of the invention. For example, while files and directories are denoted herein, the data can be organized around a variety of data structures and the terms "file," "file system," "directory" and the like should be taken broadly to include a variety of "data structures," "data sets," or "data organizations." Likewise, while the disk RAID layer 316 utilizes a RAID organization, it is contemplated that a variety of storage arrangements can be employed. Similarly, while the storage devices described herein are disks, the principles of this invention can be applied to a variety of storage devices or media including, but not limited to, electro-optical, solid-state, magnetic, and the like. Further, while a single disk is used as a coredump disk, there may be alternate embodiments in which more than one coredump disk or "storage device" is used to store a coredump. Finally, it should be understood that any and all of the principles described herein can be implemented as hardware, software that consists of a computer readable medium executing program instructions on a computer, or a combination of hardware and software. Accordingly, this description is meant to be taken only by way of example, and not to otherwise limit the scope of this invention.

The invention claimed is:

1. A method for selecting a coredump disk from a set of disks owned by a failed server into which memory data ("coredump") of the failed server is stored, comprising:
    (a) identifying available disks that can receive a coredump;
    (b) ordering the disks identified in step (a) so as to prefer disks that are least likely to be needed for normal service by the server;
    (c) further ordering the disks so as to prefer disks that require a least amount of preparation to receive a coredump; and
    (d) selecting as a best candidate for use as the coredump disk a first one of the disks in the order after the steps (a), (b), and (c).

2. The method as set forth in claim 1 further comprising, determining whether the selected coredump disk is formatted for use in normal service and if formatted, writing a "not-formatted" attribute to labels of the coredump disk.

3. The method as set forth in claim 1 further comprising, maintaining an attribute in a core region header of the coredump disk to indicate the current status of the coredump, the status including each of "complete coredump," "no coredump," "coredump in progress" and "coredump aborted."

4. The method as set forth in claim 3 further comprising, writing a "coredump in progress" signature to the coredump disk so as to prevent the coredump disk from being used for normal file service including updating the coredump status attribute to indicate the status of "coredump in-progress" and writing the updated "coredump in-progress" coredump status attribute to the core region header of the coredump disk.

5. The method as set forth in claim 1 further comprising providing pointers in the core region header that point to a file system region of the coredump disk in which the coredump is stored.

6. The method as set forth in claim 5 further comprising, writing the coredump to the file system region.

7. The method as set forth in claim 1 further comprising, where a spare disk is unavailable for selection as the coredump disk, providing coredump data to a core region in each of the set of disks in a distributed manner and, after one of either the rebooting by the failed filer or taking-over ownership of the set of disks by the taking-over ownership other filer, formatting and writing the data of the coredump to a root file system of either of the rebooted failed filer or the taking-over ownership other filer, respectively.

8. A method of identifying a coredump disk, during one of either rebooting by the failed filer or taking-over ownership the set of disks by another filer, from a set of disks owned by a failed filer into which memory data ("coredump") of the failed filer is stored, comprising:
    locating the coredump disk by reading labels on the disks of the set of disks to locate any of the disks that are non-formatted spare disks;
    caching the labels for later use by a disk label assimilation process; and
    reading a core region header in a respective label of the cached labels of each of the non-formatted spare disks to locate a coredump status attribute in the respective of the labels.

9. The method as set forth in claim 8 further comprising, freeing the cached labels after either one of the rebooting or taking-over ownership occurs and the disk label assimilation process completes.

10. The method as set forth in claim 8 further comprising, detecting a completed coredump in the coredump disk by locating a coredump status attribute in the coredump disk and thereafter formatting and writing data of the coredump to a root file system of either the rebooted failed filer or the taking-over ownership other filer.

11. The method as set forth in claim 10 further comprising, returning the coredump disk to a "hot" spare status from a status in which the coredump disk is unavailable for use in normal file service including updating the coredump status attribute to indicate a status of "no coredump" and writing the updated "no coredump" coredump status attribute data to the core region header of the coredump disk.

12. The method as set forth in claim 10 further comprising, writing a "coredump in progress" signature to the coredump disk so as to prevent the coredump disk from being used for normal file service including updating the coredump status attribute to indicate a status of "coredump in-progress" and writing the updated "coredump in-progress" coredump status attribute to the core region header of the coredump disk.

13. The method as set forth in claim 8 further comprising, where a spare disk is unavailable for selection as the coredump disk, providing coredump data to a core region in each of the set of disks in a distributed manner and, after one of either the rebooting by the failed filer or taking-over ownership of the set of disks by the taking-over ownership other filer, formatting and writing the data of the coredump to a root file system of either of the rebooted failed filer or the taking-over ownership other filer, respectively.

14. A method for selecting from a pool of candidate data storage devices owned by a server that includes a set of data storage devices with which normal file service by the server is performed, a best candidate data storage device for receiving in a predetermined coredump storage space from the server memory contents (a "coredump") comprising:

identifying data storage devices in the pool of candidate data storage devices that are available and sized to receive the coredump; and selecting the best candidate data storage device based upon a predetermined combination criteria including: (i) which data storage device of the pool of candidate data storage devices is adapted to complete reception of the coredump in the shortest time; (ii) which data storage device of the pool of candidate data storage devices is adapted to complete reception of the coredump with the least disruption of the normal file service; and (iii) which data storage device of the pool of candidate data storage devices is adapted to receive the coredump with minimal excess of storage space in the predetermined coredump storage region after reception is complete.

15. The method as set forth in claim 14 wherein the step of identifying further comprises selecting any available spare data storage device from the pool of candidate storage devices.

16. The method as set forth in claim 15 wherein the step of selecting further comprises:
  (a) selecting from the identified spare data storage devices those having a core region, including a core region header;
  (b) further selecting from the identified spare data storage devices in step (a) those having a file system region of sufficient space to receive the coredump; and
  (c) ordering the identified spare data storage devices selected by steps (a) and (b) so as to prefer data storage devices least likely to be needed for normal file service by the file server;
  (d) further ordering the identified spare data storage devices so as to prefer the disks requiring a least amount of preparation to receive the coredump; and
  (e) selecting as the best candidate, the one of the identified data storage devices, which is the first data storage device yielded after the steps (a), (b), (c) and (d).

17. A system for selecting from a pool of candidate data storage devices owned by a server that includes a set of data storage devices with which normal file service by the server is performed, a best candidate data storage device for receiving in a predetermined coredump storage space from the server memory contents (a "coredump") comprising:
  an identifier that identifies data storage devices in the pool of candidate data storage devices that are available and sized to receive the coredump; and
  a selector operated by a processor, with a selector that selects the best candidate data storage device based upon a predetermined combination criteria including: (i) which data storage device of the pool of candidate data storage devices is adapted to complete reception of the coredump in the shortest time; (ii) which data storage device of the pool of candidate data storage devices is adapted to complete reception of the coredump with the least disruption of the normal file service; and (iii) which data storage device of the pool of candidate data storage devices is adapted to receive the coredump with minimal excess of storage space in the predetermined coredump storage region after reception is complete.

18. The system as set forth in 17 wherein the identifier is constructed and arranged to select any available spare data storage device from the pool of candidate storage devices.

19. The system as set forth in claim 18 wherein the selector is constructed and arranged to:
  (a) select from the identified spare data storage devices those having a core region, including a core region header;
  (b) further select from the identified spare data storage devices in step (a) those having a file system region of sufficient space to receive the coredump; and
  (c) order the identified spare data storage devices selected by steps (a) and (b) so as to prefer data storage devices least likely to be needed for normal file service by the file server;
  (d) further order the identified spare data storage devices so as to prefer the disks requiring a least amount of preparation to receive the coredump; and
  (e) select as the best candidate, the one of the identified data storage devices, which is the first data storage device yielded after the selector performs (a), (b), (c) and (d).

20. A method, comprising:
  identifying available disks of a group of disks that can receive a coredump; and
  selecting a best candidate for use as a coredump disk, where the best candidate is least likely to be needed for normal service by a server, and requires the least amount of preparation to receive the coredump.

21. The method as set forth in claim 20, further comprising:
  determining whether the selected coredump disk is formatted for use in normal service and if formatted, writing a "not-formatted" attribute to labels of the coredump disk.

22. The method as set forth in claim 20, further comprising:
  maintaining an attribute in a core region header of the coredump disk to indicate the current status of the coredump, the status including each of "complete coredump," "no coredump," "coredump in progress" and "coredump aborted."

23. The method as set forth in claim 22, further comprising:
  writing a "coredump in progress" signature to the coredump disk so as to prevent the coredump disk from being used for normal file service including updating the coredump status attribute to indicate the status of "coredump in-progress" and writing the updated "coredump in-progress" coredump status attribute to the core region header of the coredump disk.

24. The method as set forth in claim 22, further comprising:
  providing pointers in the core region header that point to a file system region of the coredump disk in which the coredump is stored.

25. The method as set forth in claim 24, further comprising:
  writing the coredump to the file system region.

26. An apparatus, comprising:
  means for identifying available disks that can receive a coredump; and
  means for selecting a best candidate for use as a coredump disk, where the best candidate is least likely to be needed for normal service by a server, and requires the least amount of preparation to receive the coredump.

27. The apparatus as set forth in claim 26, further comprising:

means for determining whether the selected coredump disk is formatted for use in normal service and if formatted, writing a "not-formatted" attribute to labels of the coredump disk.

28. The apparatus as set forth in claim 26, further comprising:

means for maintaining an attribute in a core region header of the coredump disk to indicate the current status of the coredump, the status including each of "complete coredump," "no coredump," "coredump in progress" and "coredump aborted."

29. The apparatus as set in forth in claim 28, further comprising:

means for writing a "coredump in progress" signature to the coredump disk so as to prevent the coredump disk from being used for normal file service including updating the coredump status attribute to indicate the status of "coredump in-progress" and writing the update "coredump disk in-progress" coredump status attribute to the core region header of the coredump disk.

30. The apparatus as set forth in claim 28, further comprising:

means for providing pointers in the core region header that point to a file system region of the coredump disk in which the coredump is stored.

31. The apparatus as set forth in claim 30, further comprising:

means for writing the coredump to the system region.

* * * * *